United States Patent
Shibata

[19]

[11] Patent Number: 6,105,951
[45] Date of Patent: Aug. 22, 2000

[54] WORK POSITIONING JIGS FOR MACHINE TOOLS

[75] Inventor: Hidetaka Shibata, Aichi, Japan

[73] Assignee: Okuma Corporation, Nagoya, Japan

[21] Appl. No.: 09/413,485

[22] Filed: Oct. 6, 1999

[30]     Foreign Application Priority Data

Oct. 7, 1998    [JP]    Japan .................................. 10/284949

[51] Int. Cl.⁷ .................................................. B23Q 3/00
[52] U.S. Cl. ........................... 269/99; 269/100; 269/305; 269/900; 269/315
[58] Field of Search ..................... 269/303–319, 269/10, 99, 100, 291, 297–301, 48.1, 287, 900

[56]                References Cited

U.S. PATENT DOCUMENTS

| | | | |
|---|---|---|---|
| 2,560,525 | 7/1951 | Nyl .......................................... | 269/100 |
| 4,861,011 | 8/1989 | Varga ......................................... | 269/99 |
| 5,531,551 | 7/1996 | Bowers .................................. | 269/48.1 |
| 6,042,096 | 3/2000 | MacLean .................................. | 269/99 |

*Primary Examiner*—Robert C. Watson
*Attorney, Agent, or Firm*—Jacobson, Price, Holman & Stern, PLLC

[57]                ABSTRACT

A work positioning jig for machine tools is attached to a table with use of a T-slot formed in a work holding surface of the table to position work in place. The jig comprises a jig body having a positioning portion to be brought into contact with the work, and a wedgelike pressing portion formed integrally with and projecting downward from the lower end of the positioning portion centrally thereof. A vertical pin extends through the positioning portion and the pressing portion of the jig body centrally thereof and is movable upward and downward. The pin has attached to its lower end a U-shaped brace member fitted over the pressing portion from below and to be fitted into the T-slot of the table. The pin is biased upward by the force of coned disk springs, with the brace member inserted in the T-slot, thereby causing the pressing portion to expand upright walls of the brace member into pressing contact with side faces of the table defining the T-slot. The jig can be attached to the table easily.

3 Claims, 7 Drawing Sheets

WORK POSITIONING JIGS FOR MACHINE TOOLS

BACKGROUND OF THE INVENTION

The present invention relates to work positioning jigs to be attached to work fixing members of machine tools using recesses formed in the work holding surface of the fixing member.

Figure 5:
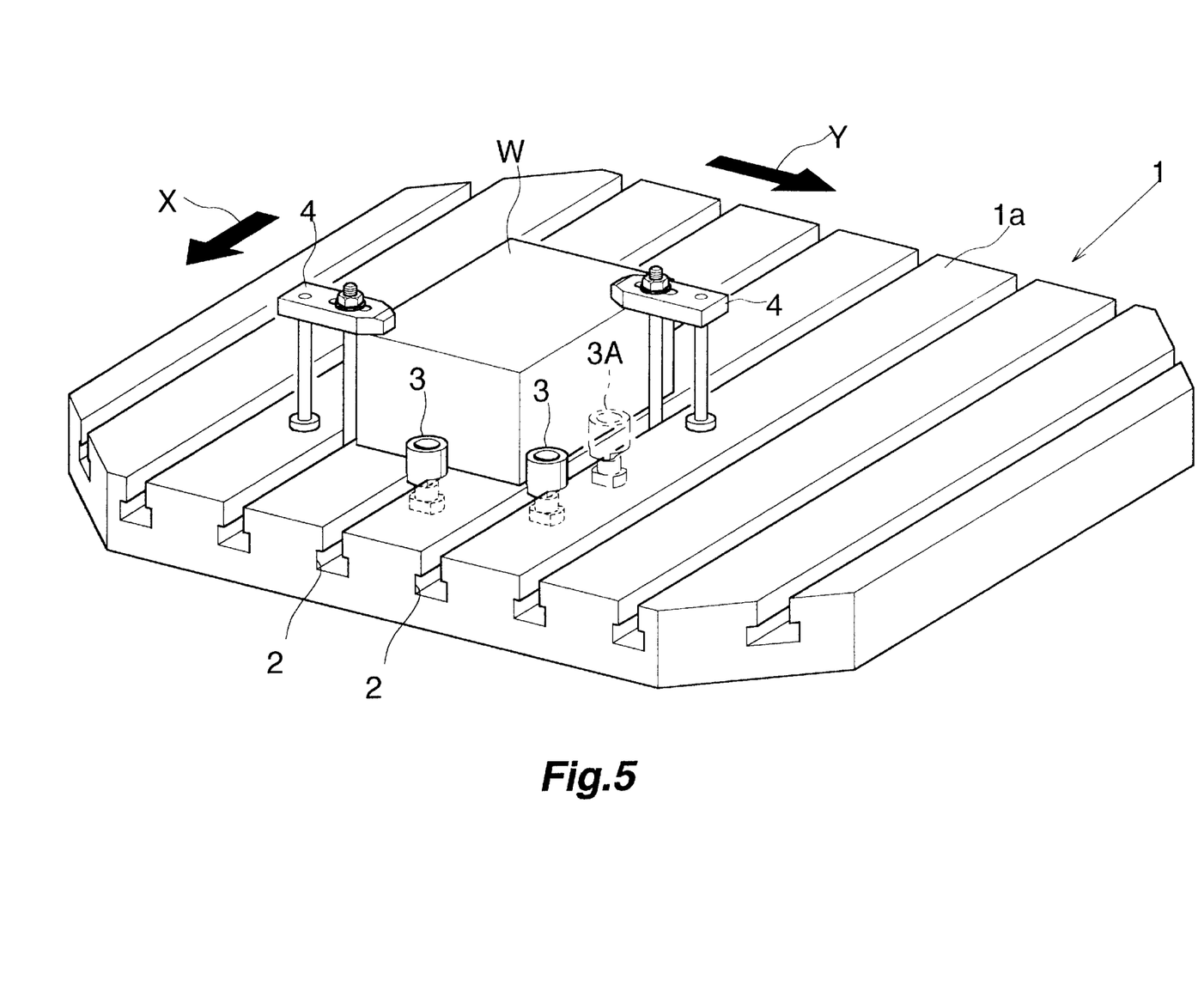
FIG. 5 is a perspective view showing a conventional method of attaching work to the table of a machine tool.

Conventionally work is fastened to the work holding surface of a table (work fixing member) of a machine tool, for example, by an arrangement as shown in FIG. 5. With reference to FIG. 5, the work holding surface 1a of a table 1 is formed with a plurality of parallel T-slots 2 (recessed portions) each left open at lengthwise opposite ends thereof. A plurality of work positioning jigs 3 are attached to the table 1 using some of the T-slots 2. The position of the work W is determined by the jigs 3 with respect to an X-direction (see the arrow X) and a Y-direction (see the arrow Y). A plurality of clamps 4 are also attached to the table 1 using some T-slots 2. The work W is fixed to the table 1 by the clamps 4.

Figure 6:
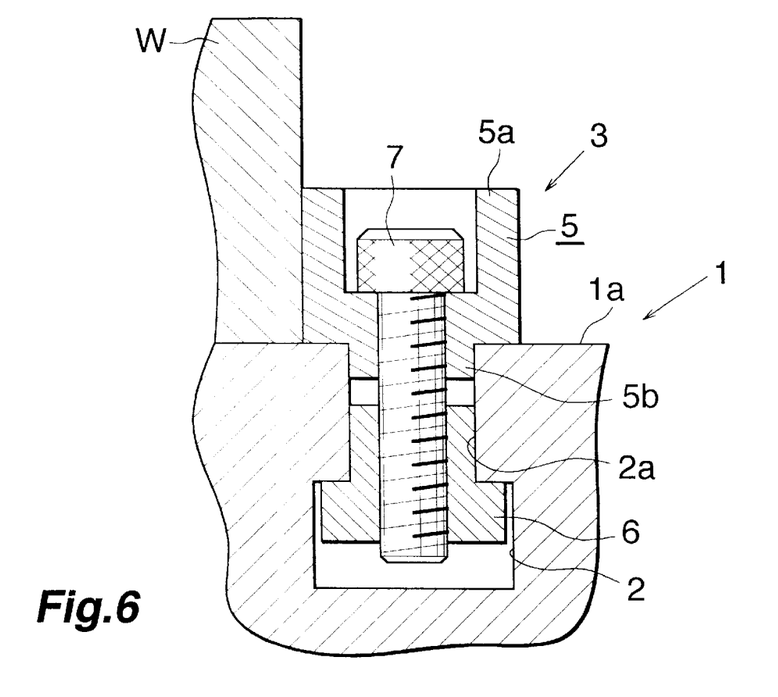
FIG. 6 is an enlarged fragmentary view in vertical section showing a work positioning jig as attached to the table by the method of FIG. 5.

FIG. 6 shows the work positioning jig 3 heretofore used as attached to the table 1 with use of the T-slot 2. The jig 3 comprises a jig body 5 having a positioning portion 5a in the form of a bottomed cylinder and a fitting portion 5b formed at the lower end of the positioning portion 5a integrally therewith and fittable in a narrow portion 2a of the T-slot 2, T-slot nut 6 fittable in the T-slot 2, and a bolt 7 extending through the positioning portion 5a and the fitting portion 5b of the jig body 5 from above and screwed in the nut 6.

However, to attach the work positioning jig 3 to the table 1, it is necessary to insert the nut 6 into the T-slot 2 through the opening at lengthwise one end thereof and to tighten up the bolt 7 as by a wrench. The jig 3 therefore has the problem of necessitating a cumbersome procedure. The jig 3 also has the problem of being cumbersome to remove from the table 1 because it is necessary for removal to loosen the bolt 7 as by the wrench and to take out the nut 6 from the lengthwise end opening of the T-slot 2. Further depending on the type of the work W to be handled, it becomes necessary to use another work positioning jig 3A (indicated in chain lines in FIG. 5) after such jigs 3 and clamps 4 have been attached to the table 1. In this case, there arises a need to remove the jig 3 already attached, thereafter install the additional jig 3A and attach the removed jig 3 again. Every time the jig 3 is thus removed or attached, the T-slot nut 6 needs to be inserted into or removed from the T-slot 2 through the lengthwise end opening, and the bolt 7 must be loosened or tightened up, so that the procedure required becomes cumbersome all the more. Moreover, when the bolt 7 of the additional jig 3A or of the jig 3 temporarily removed is to be tightened up as by the wrench, the jig 3 or 3A or the clamp 4 previously installed is likely to become an obstacle, hence the problem of low work efficiency. Work W of particular type may require use of an additional jig 3A after attaching jigs 3 and clamps 4 to the table 1 and temporarily holding the work W to the table 1. In this case, the jig 3 or clamp 4 previously attached or the work W will interfere with the wrench or the like for use in tightening up the bolt 7 of the additional jig 3A to entail the problem of an impaired work efficiency.

Figure 7:
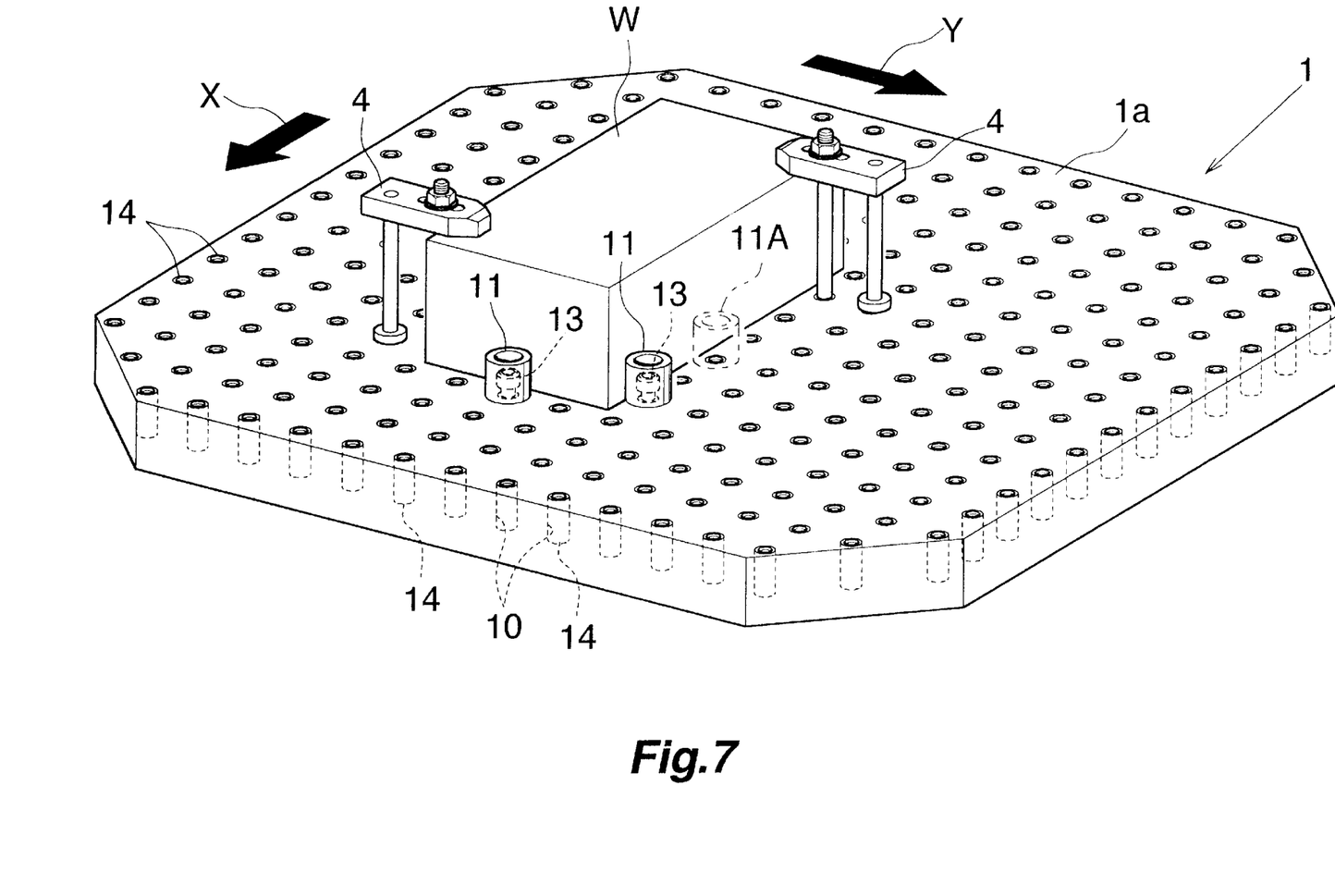
FIG. 7 is a perspective view showing another conventional method of attaching work to the table of a machine tool.

Alternatively, the table 1 of the machine tool has a work holding surface 1a, to which work W is fastened in the manner shown in FIG. 7. Incidentally throughout FIGS. 5 to 8, like parts are designated by like reference numerals and will not be described repeatedly. With reference to FIG. 7, the work holding surface 1a of the table 1 is formed with a plurality of cylindrical bores 10 (recessed portions), and a plurality of work positioning jigs 11 are attached to the table 1 using some of the cylindrical bores 10. The position of the work W is determined by the jigs 11 with respect to an X-direction (see the arrow X) and a Y-direction (see the arrow Y).

Figure 8:
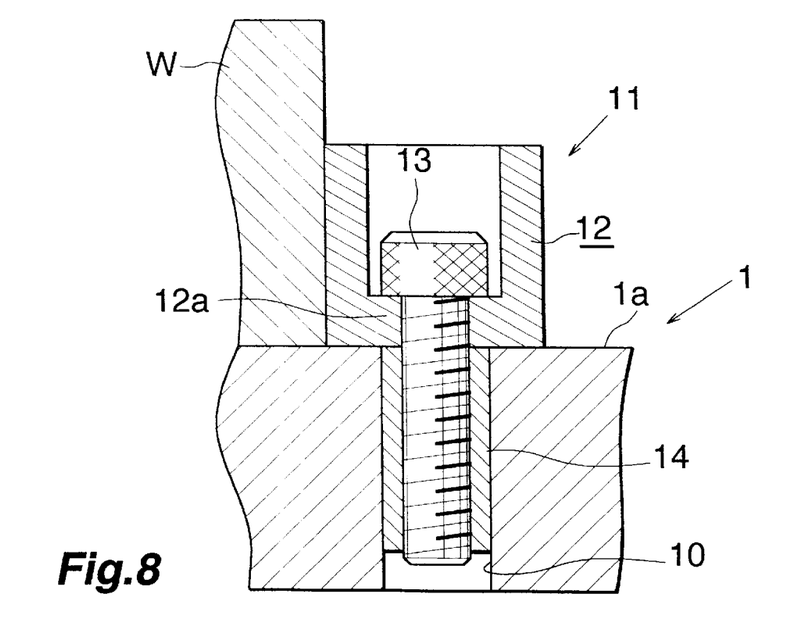
FIG. 8 is an enlarged fragmentary view in vertical section showing a work positioning jig as attached to the table by the method of FIG. 7.

FIG. 8 shows the work positioning jig 11 to be attached to the table 1 using the cylindrical bore 10. The jig 11 comprises a jig body 12 in the form of a cylinder having a bottom wall 12a, and a bolt 13 inserted through the bottom wall 12a from above and screwed in an internally threaded bush 14 which is fixed in the cylindrical bore 10 by a press fit.

However, the jig 11 has the problem of being cumbersome to attach to the table 1 since the bush 14 needs to be fixed into the cylindrical bore 10 by a press fit. The bolt 13 must be tightened up as by a wrench, hence the problem of necessitating a cumbersome procedure. Further depending on the type of the work W to be handled, it becomes necessary to use another work positioning jig 11A (indicated in chain lines in FIG. 7) after such jigs 11 and clamps 4 have been attached to the table 1. When the bolt 13 of the additional jig 11A is to be tightened up as by the wrench, the jig 11 or the clamp 4 previously installed is likely to become an obstacle, hence the problem of low work efficiency. Work W of particular type may require use of an additional jig 11A after attaching jigs 11 and clamps 4 to the table 1 and temporarily holding the work W to the table 1. In this case, the jig 11 or clamp 4 previously attached or the work W will interfere with the wrench or the like for use in tightening up the bolt 13 of the additional jig 11A to entail the problem of an impaired work efficiency.

DISCLOSURE OF THE INVENTION

An object of the present invention is to provide a work positioning jig for use in machine tools which is free of the foregoing problems and which can be attached to a work fixing member easily.

The present invention provides a work positioning jig for machine tools which is to be attached to a work fixing member of the machine tool with use of a recessed portion formed in a work holding surface of the fixing member to position work in place. The work positioning jig is characterized in that the jig comprises a jig body having a positioning portion to be brought into contact with the work and a tapered pressing portion fixedly provided at one end of the positioning portion and to be inserted into the recessed portion, a pin extending through the jig body and movable relative to the jig body longitudinally thereof, a brace member attached to the pin at an end portion thereof projecting beyond the pressing portion so as to fit over the pressing portion, movable relative to the jig body and to be fitted into the recessed portion, and means for biasing the pin in a direction opposite to the pressing portion with respect to the jig body, the pin being biased by the biasing means to bring one end of the positioning portion of the jig body adjacent to the pressing portion into face-to-face contact with the work holding surface while causing the pressing portion to expand the brace member into pressing contact with faces of the recessed portion perpendicular to the work holding surface.

The work positioning jig of the present invention is attached to the work fixing member in the following manner. The brace member is fitted into the recessed portion after the pin and the brace member have been moved toward a direction opposite to the biasing direction of the force of the biasing means, i.e., toward the positioning portion of the jig body, and the force exerted on the pin and the brace member and acting against the force of the biasing means is thereafter removed, whereupon the end of the positioning portion of the jig adjacent to the pressing portion is brought into face-to-face contact with the work holding surface by the force of the biasing means. The force also causes the pressing portion to expand the brace member, pressing this member against the faces of the recessed portion perpendicular to the work holding surface, whereby the jig is attached to the work fixing member. The jig of the invention is removed from the work fixing member in the following manner. The pin and the brace member are moved in a direction opposite to the biasing direction of the biasing means against the force of the biasing means. This releases the brace member from pressing contact with the above-mentioned faces of the recessed portion, so that the jig is removed from the work fixing member by withdrawing the brace member from the recessed portion.

With the conventional jig to be attached to a table (work fixing member) formed with T-slots, the T-slot nut needs to be inserted into and removed from the T-slot through a lengthwise end opening of the slot, whereas the jig of the invention does not require such a procedure, nor is it necessary to tighten up or loosen a bolt as by a wrench. The present jig can therefore be attached to the work fixing member easily. When there arises a need to use an additional work positioning jig after some jigs and clamps have been attached to the table, it is not necessary to insert or remove a T-slot nut into a T-slot through a lengthwise end opening thereof, nor is it necessary to tighten up or loosen a bolt every time the jig is to be attached or removed, hence an improved work efficiency. Moreover, the previously attached jig is unlikely to interfere with the procedure for attaching the additional jig. This also leads to an improvement in work efficiency. Further in the case where an additional jig is to be used after the work has been temporarily held in place, the jig or clamp previously attached or the work will not become an obstacle to ensure an improved work efficiency.

Whereas the conventional jig to be attached to a table formed with cylindrical bores requires the procedure of fixing an internally threaded bush into the bore by a press fit, the work positioning jig of the invention for use in machine tools does not require such a procedure. Moreover, there is no need to use a wrench or the like for tightening up or loosening. Thus, the jig can be attached to the work fixing member by a facilitated procedure. Every time the jig is to be removed and attached for the use of an additional positioning jig after some jigs and clamps have been installed on the table, no bolt needs to be tightened up or loosened, hence an improved work efficiency. Moreover, the jig previously attached is unlikely to become an obstacle in installing the additional jig. This ensures an improved work efficiency. Even when an additional jig is to be used after work has been temporarily held in place, there is no likelihood that the previously attached jig or clamp or the work will interfere with the handling of the additional jig, hence an improvement in work efficiency.

With the work positioning jig of the invention for use in machine tools, the recessed portion formed in the work holding surface is a slot, the pressing portion being in the form of a tapered wedge, the brace member being approximately U-shaped and having inner surfaces so inclined as to be positioned away from each other toward the positioning portion, the pin being biased by the biasing means to cause the pressing portion to expand opposed walls of the brace member into pressing contact with respective opposite side faces of the fixing member defining the slot.

In attaching the jig to the work fixing member in this case, the force of the biasing means moves the brace member with the pin toward the pressing portion, which in turn expands the opposed walls of the brace member into pressing contact with the respective side faces defining the slot. Since the brace member is pressed against the slot-defining side faces by the force of the biasing means while moving toward the positioning portion of the jig body, the positioning portion is pressed against the work holding surface by the reaction of the biasing force, with the result that the jig can be fastened to the fixing member more firmly. On the other hand, when the pin is moved in a direction opposite to the biasing direction against the force of the biasing means to remove the jig from the work fixing member, the brace member moves toward the outer end of the pressing portion relative thereto, whereby the opposed walls of the brace member are released from the pressing contact with the slot-defining side faces.

Alternatively with the work positioning jig of the invention for use in machine tools, the recessed portion formed in the work holding surface is a cylindrical bore, the pressing portion being in the form of a cone having an outer peripheral surface decreasing in diameter toward a direction away from the positioning portion, the brace member being in the form of a hollow cylinder increasing in inside diameter toward the positioning portion, the brace member having a plurality of slits formed in a peripheral wall thereof and arranged at a spacing circumferentially thereof, the pin being biased by the biasing means to cause the pressing portion to expand the peripheral wall of the brace member into pressing contact with an inner periphery of the fixing member defining the cylindrical bore.

In attaching the jig to the work fixing member in this case, the force of the biasing means moves the brace member with the pin toward the pressing portion, which in turn expands the peripheral wall of the brace member into pressing contact with the inner periphery of the fixing member defining the cylindrical bore. Since the brace member is pressed against the bore-defining inner periphery by the force of the biasing means while moving toward the positioning portion of the jig body, the positioning portion is pressed against the work holding surface by the reaction of the biasing force, with the result that the jig can be fastened to the fixing member more firmly. On the other hand, when the pin is moved in a direction opposite to the biasing direction against the force of the biasing means to remove the jig from the work fixing member, the brace member moves toward the outer end of the pressing portion relative thereto, whereby the peripheral wall of the brace member is released from the pressing contact with the bore-defining inner periphery.

DESCRIPTION OF THE PREFERRED EMBODIMENTS

First Embodiment

Figure 1:
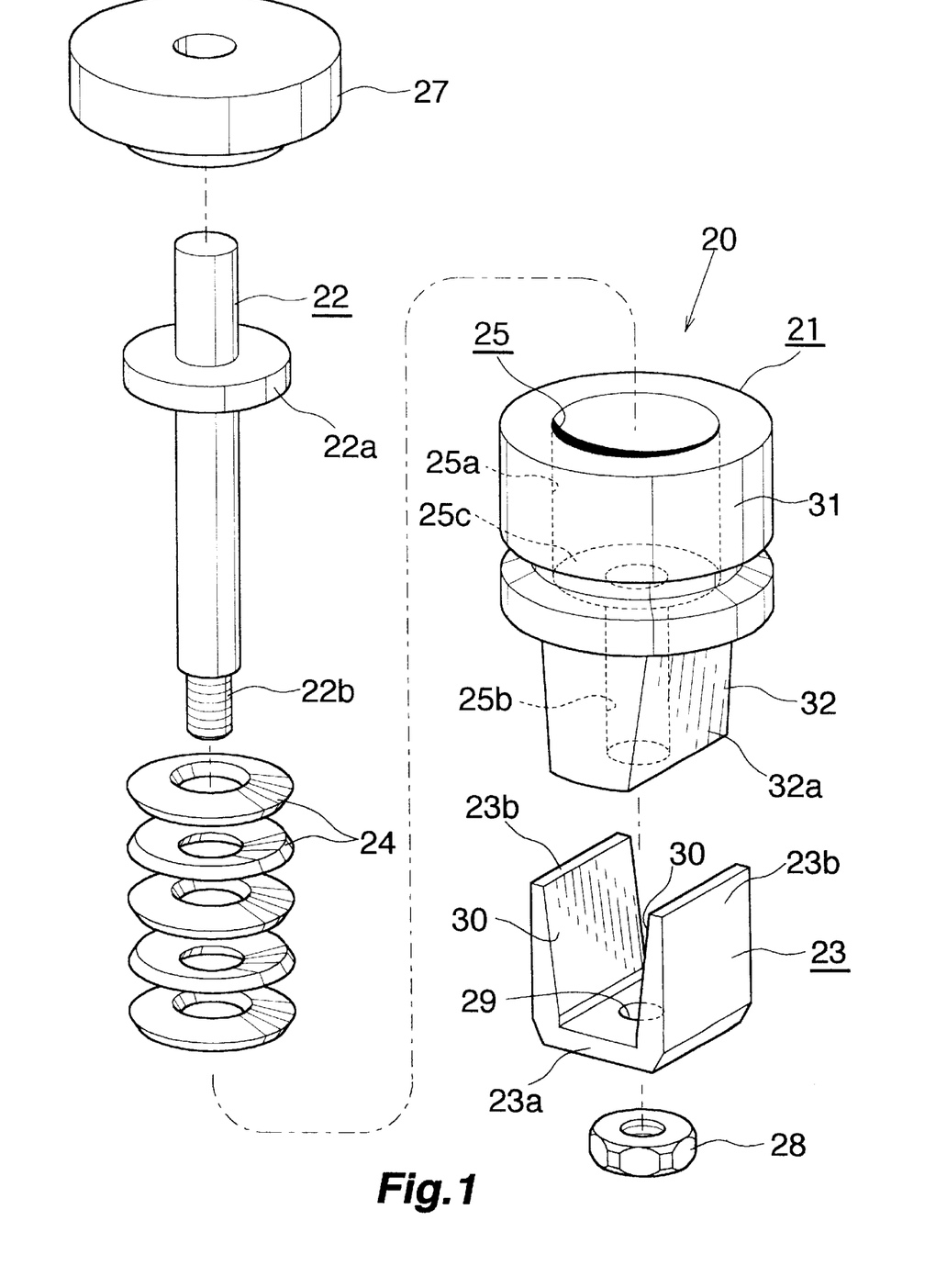
FIG. 1 is an exploded perspective view showng a first embodiment of work positioning jig of the invention.
Figure 2:
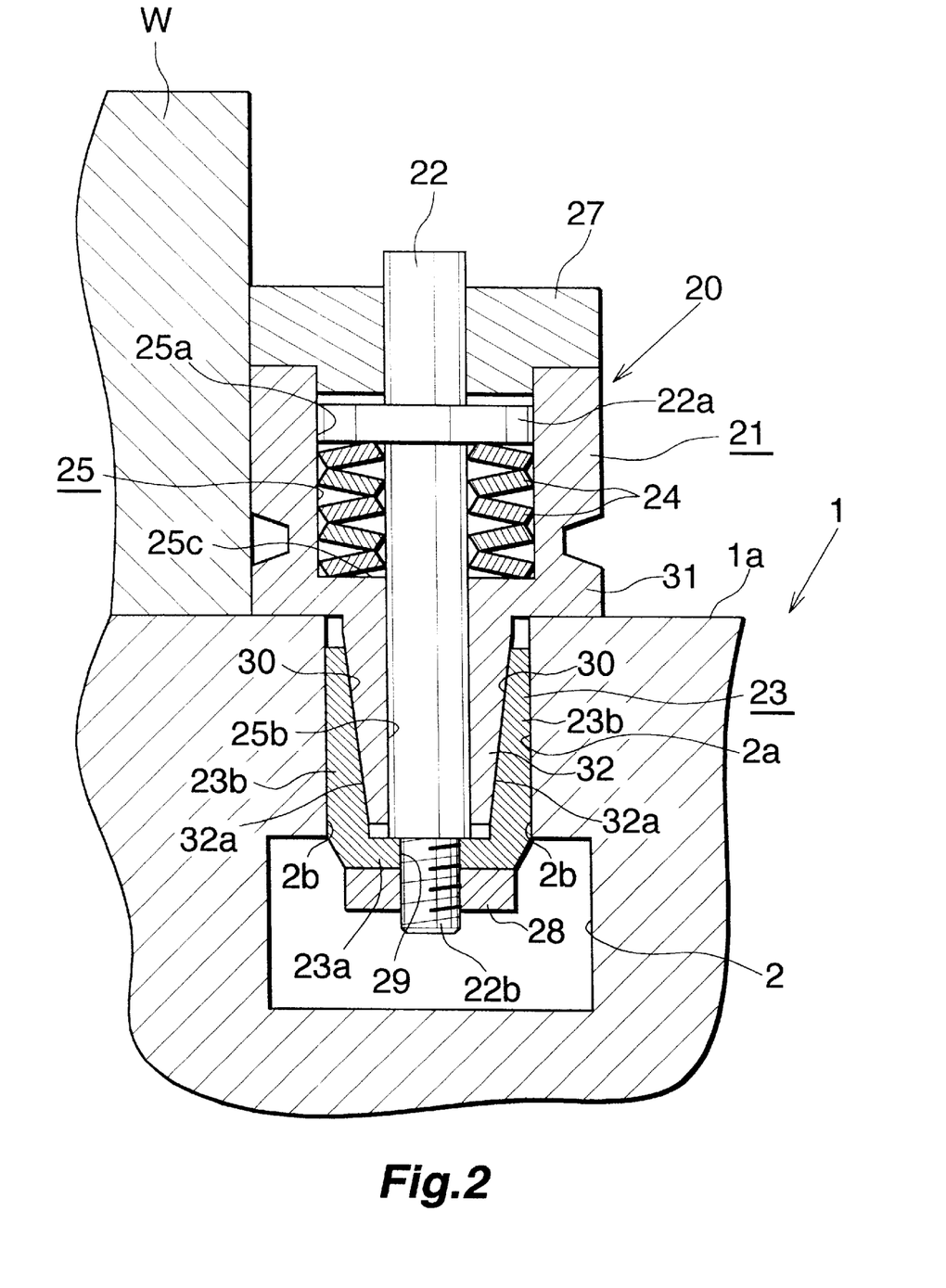
FIG. 2 is a view in vertical section showing the jig as attached to a table having T-slots.

FIGS. 1 and 2 show this embodiment, i.e., a work positioning jig of the invention for use with a table which has a work holding surface formed with T-slots.

FIG. 1 shows the work positioning jig, and FIG. 2 shows the jig as attached to the table of a machine tool.

With reference to FIGS. 1 and 2, the work positioning jig 20 comprises a jig body 21 having a positioning portion 31 in the form of a solid cylinder and having a peripheral surface to be brought into contact with work W for positioning the work W in place and a wedgelike pressing portion 32 formed integrally with the positioning portion 31 and projecting downward from the lower end of the portion 31 centrally thereof, a vertical pin 22 extending through the positioning portion 31 and the pressing portion 32 of the jig body 21 centrally thereof and movable upward and downward, a U-shaped brace member 23 attached to the lower end portion of the vertical pin 22 projecting downward beyond the pressing portion 32, fitted over the pressing portion 32 from below and to be fitted into the narrow portion 2a of a T-slot 2 of a table 1, and a plurality of coned disk springs 24 for biasing the pin 22 upward relative to the jig body 21.

A vertical stepped bore 25 comprising an upper large portion 25a and a lower small portion 25b extends through the positioning portion 31 and the pressing portion 32 of the jig body 21. The lower small portion 25b of the bore 25 has an inside diameter approximately equal to the outside diameter of the pin 22. The pressing portion 32 extending from the lower end of the positioning portion 31 of the jig body 21 has opposite sides adapted for face-to-face contact with opposite side portions of the table 1 which define the T-slot 2 formed in the work holding surface 1a thereof. The pressing portion 32 of the jig body 21 expands the brace member 23 under the action of the disk springs 24, pressing the brace member 23 against opposite side faces of the table 1 which define the narrow portion 2a of the T-slot 2 in the table and which are perpendicular to the work holding surface 1a. The side surfaces of the pressing portion 32 are so inclined as to approach each other as they extend downward. The inclined surfaces are indicated at 32a.

The vertical pin 22 is inserted through the stepped bore 21 from above the jig body 21, and has its lower portion slidably inserted in the lower small bore portion 25b and is thereby prevented from wobbling. The vertical pin 22 is integrally formed, at an upper portion thereof positioned within the upper large bore portion 25a, with a spring retainer 22a in the form of an outer flange and having an outside diameter not greater than the inside diameter of the large bore portion 25a. The portion of the vertical pin 22 upward from the spring retainer 22a vertically movably extends through a closure 27 which is removably attached to the upper end of the positioning portion 31 of the jig body 21 for closing the upper-end opening of the stepped bore 25.

The coned disk springs 24 are fitted around the vertical pin 22 between a stepped portion 25c of the bore 25 and the spring retainer 22a of the pin 22, biasing the pin 22 upward relative to the jig body 21 at all times.

The brace member 23 comprises a horizontal wall 23a and a pair of upright walls 23b opposed to each other and integral with the horizontal wall 23a, and is fastened by a nut 28 to an externally threaded lower end portion 22b of the pin 22 which portion has a reduced diameter. More specifically, the externally threaded portion 22b is inserted through a bore 29 vertically extending through the horizontal wall 23a of the brace member 23, and the nut 28 is screwed on the lower end of the threaded portion 22b, whereby the brace member 23 is fixed to the pin 22. The upright walls 23b of the brace member 23 each have a vertical outer surface, and the distance between the vertical outer surfaces is not greater than the width of the narrow portion 2a of the T-slot 2. The upright walls 23b have on inner sides thereof respective inclined surfaces 30 slanting in directions away from each other as the walls extend upward. When the brace member 23 moves upward relative to the pressing portion 32 of the jig body 21, the inclined surfaces 30, 32a act to expand the two upright walls 23b of the brace member 23 outward, pressing the walls 23b against opposite side faces of the table 1 which define the narrow portion 2a of the T-slot 2 in the table and which are perpendicular to the work holding surface 1a.

To attach the work positioning jig 20 thus constructed to the table 1 of the machine tool using the T-slot 2, the brace member 23 is fitted into the narrow portion 2a of the T-slot 2 first, with the pin 22 moved down against the biasing force of the coned disk springs 24, to bring opposite side portions of the pressing portion 32 of the jig body 21 at the lower end of its positioning portion 31 into face-to-face contact with the side portions defining the T-slot 2 in the work holding surface 1a. When the pin 22 is subsequently returned, the pin 22 and the brace member 23 are urged upward by the force of the springs 24, permitting the pressing portion 32 to act as a wedge to expand the two upright walls 23b of the brace member 23 outward and press the walls 23b against the respective side faces defining the narrow portion 2a of the T-slot 2. In this way, the jig 20 is fixed to the table 1 (see FIG. 2).

The jig 20 is removed from the table 1 by moving the pin 22 down against the biasing force of the disk springs 24 to thereby lower the brace member 23 relative to the pressing portion 32 and release the two upright walls 23b from pressing contact with opposite side faces defining the T-slot 2, and thereafter withdrawing the brace member 23 from the T-slot 2 upward.

Second Embodiment

Figure 3:
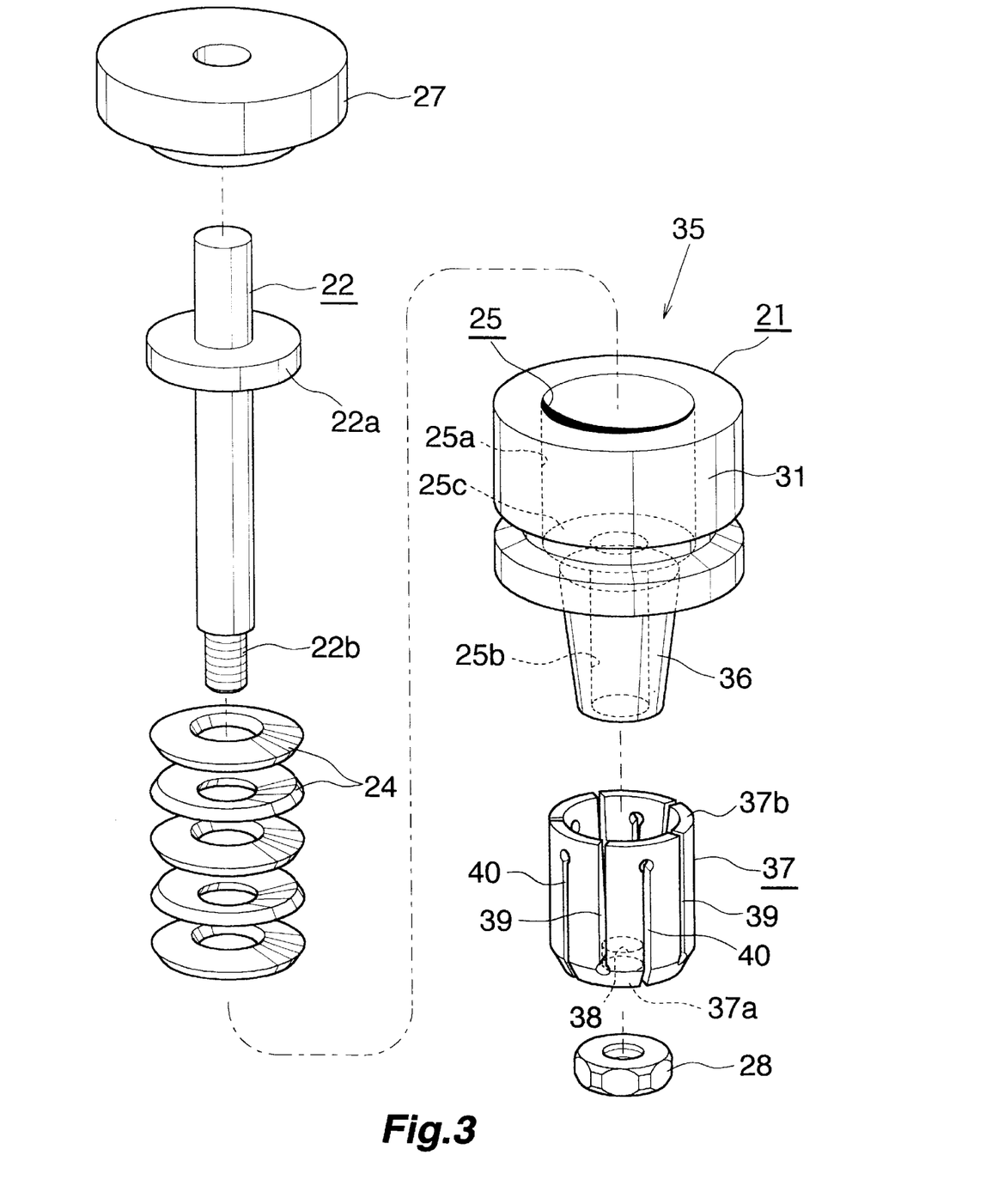
FIG. 3 is an exploded perspective view showing a second embodiment of work positioning jig of the invention.
Figure 4:
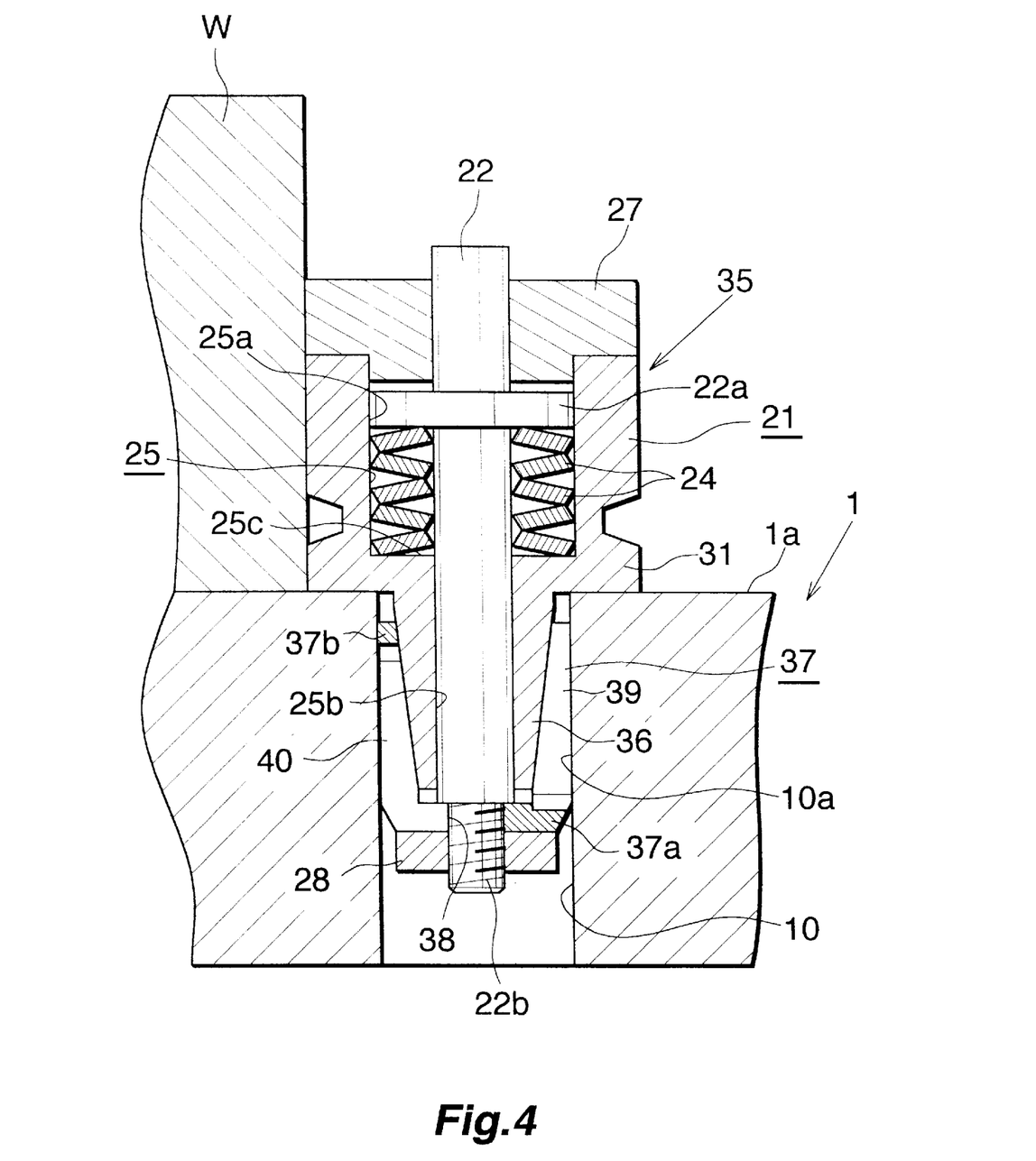
FIG. 4 is a view in vertical section showing the jig of the second embodiment as attached to a table having cylindrical bores.

FIGS. 3 and 4 show this embodiment, i.e., a work positioning jig of the invention for use with a table which has a work holding surface formed with cylindrical bores.

FIG. 3 shows the work positioning jig, and FIG. 4 shows the jig as attached to the table of a machine tool.

In the case of this embodiment, the body 21 of the work positioning jig 35 has a conical pressing portion 36 having an outer peripheral surface which decreases in diameter downward. A brace member 37 is in the form of a cylinder having an open upper end and a bottom wall 37a and increases in inside diameter upward. A vertical pin 22 has an externally threaded portion 22b inserted through a vertical through bore 38 formed in the bottom wall 37a of the brace member 37. A nut 28 is screwed on the lower end of the threaded portion 22b, whereby the brace member 37 is fixed to the pin 22. The peripheral wall 37b of the brace member 37 is formed with a plurality of slits 39 arranged at a spacing circumferentially thereof and extending downward from the upper end of the wall. Further formed between each pair of adjacent slits 39 of the brace member 37 is a slit 40 formed in the bottom wall 37a, extending from the inner periphery of the wall 37a radially outward to the peripheral wall 37b and further extending in the wall 37a upward. With the exception of the above feature, the second embodiment is the same as the first, and like parts are designated by like reference numerals and will not be described repeatedly.

To attach the work positioning jig 35 thus constructed to the table 1 of the machine tool using the cylindrical bore 10, the brace member 37 is fitted into the cylindrical bore 10 first, with the pin 22 moved down against the biasing force of the coned disk springs 24, to bring the periphery of the pressing portion 36 of the jig body 21 at the lower end of its positioning portion 31 into face-to-face contact with the table inner periphery 10a defining the cylindrical bore 10 in the work holding surface 1a. When the pin 22 is subsequently returned, the pin 22 and the brace member 37 are urged upward by the force of the springs 24, permitting the pressing portion 36 to act as a wedge to expand the peripheral wall 37b of the brace member 37 outward and press the wall 37b against the bore-defining inner periphery 10a. In this way, the jig 35 is fixed to the table 1 (see FIG. 4).

The jig 35 is removed from the table 1 by moving the pin 22 down against the biasing force of the disk springs 24 to thereby lower the brace member 37 relative to the pressing portion 36 and release the peripheral wall 37b from pressing contact with the inner periphery 10a defining the cylindrical bore 10, and thereafter withdrawing the brace member 37 from the cylindrical bore 10 upward.

According to the foregoing two embodiments, the pressing portion of the jig body is integral with the positioning portion thereof, whereas this is not limitative; the pressing member may be provided by fixing a separate member to the positioning portion. Although the table for use with the foregoing two embodiment is horizontal, the jig of the present invention is usable also for an inclined or vertical table. Further although the work fixing member of the machine tool is a table in the case of the foregoing two embodiments, the fixing member is not limited to the table but can be other member.

What is claimed is:

1. A work positioning jig for machine tools which is to be attached to a work fixing member of the machine tool with use of a recessed portion formed in a work holding surface of the fixing member to position work in place, the work positioning jig being characterized in that the jig comprises a jig body having a positioning portion to be brought into contact with the work and a tapered pressing portion fixedly provided at one end of the positioning portion and to be inserted into the recessed portion, a pin extending through the jig body and movable relative to the jig body longitudinally thereof, a brace member attached to the pin at an end portion thereof projecting beyond the pressing portion so as to fit over the pressing portion, movable relative to the jig body and to be fitted into the recessed portion, and means for biasing the pin in a direction opposite to the pressing portion with respect to the jig body, the pin being biased by the biasing means to bring one end of the positioning portion of the jig body adjacent to the pressing portion into face-to-face contact with the work holding surface while causing the pressing portion to expand the brace member into pressing contact with faces of the recessed portion perpendicular to the work holding surface.

2. A work positioning jig for machine tools according to claim 1 which is characterized in that the recessed portion formed in the work holding surface is a slot, the pressing portion being in the form of a tapered wedge, the brace member being approximately U-shaped and having inner surfaces so inclined as to be positioned away from each other toward the positioning portion, the pin being biased by the biasing means to cause the pressing portion to expand opposed walls of the brace member into pressing contact with respective opposite side faces of the fixing member defining the slot.

3. A work positioning jig for machine tools according to claim 1 which is characterized in that the recessed portion formed in the work holding surface is a cylindrical bore, the pressing portion being in the form of a cone having an outer peripheral surface decreasing in diameter toward a direction away from the positioning portion, the brace member being in the form of a hollow cylinder increasing in inside diameter toward the positioning portion, the brace member having a plurality of slits formed in a peripheral wall thereof and arranged at a spacing circumferentially thereof, the pin being biased by the biasing means to cause the pressing portion to expand the peripheral wall of the brace member into pressing contact with an inner periphery of the fixing member defining the cylindrical bore.

* * * * *